(No Model.)
E. C. MERRILL.
GAS PRESSURE REGULATOR.
No. 329,928. Patented Nov. 10, 1885.
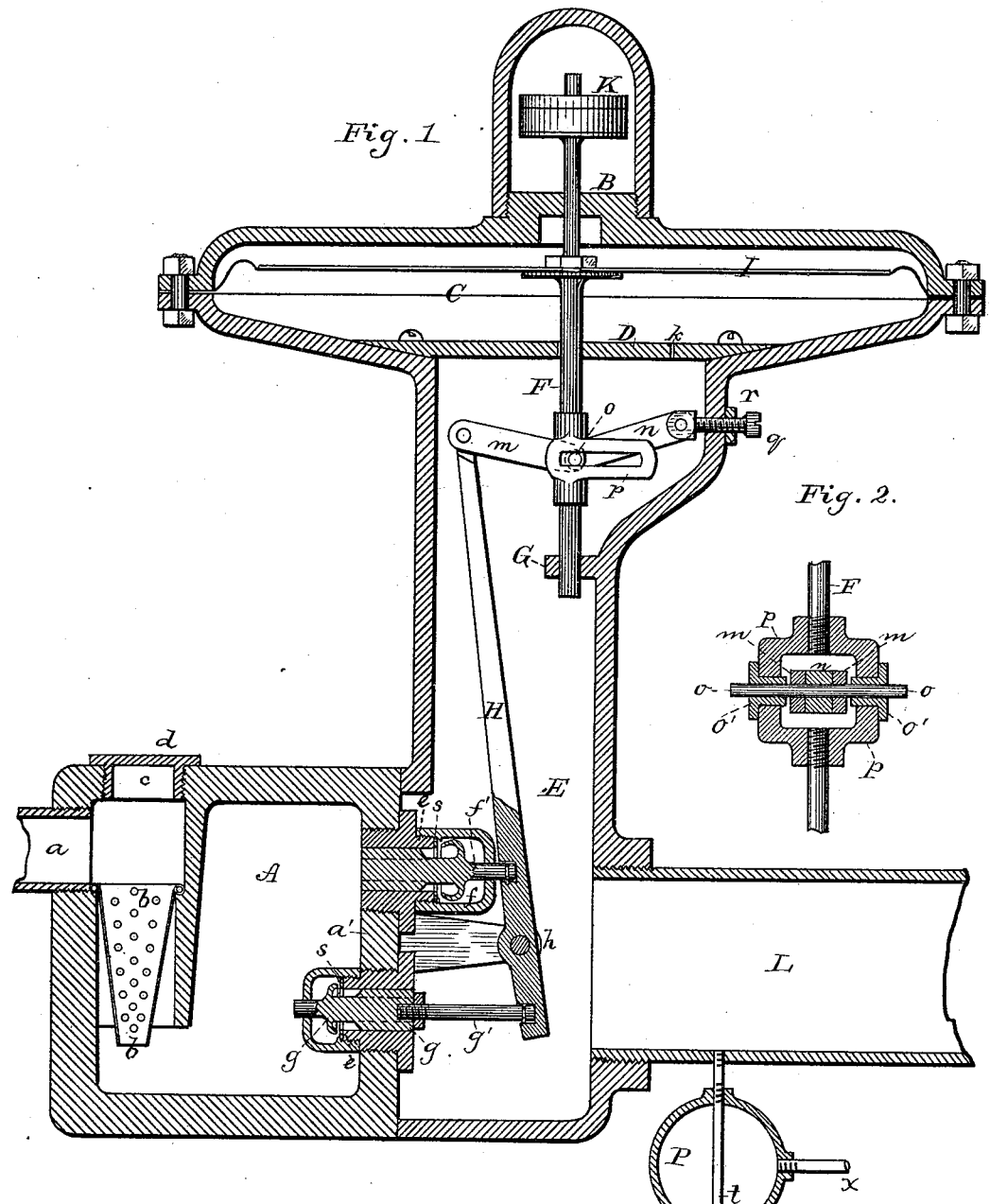

UNITED STATES PATENT OFFICE.

EDWIN C. MERRILL, OF PITTSBURG, PENNSYLVANIA.

GAS-PRESSURE REGULATOR.

SPECIFICATION forming part of Letters Patent No. 329,928, dated November 10, 1885.

Application filed June 23, 1885. Serial No. 169,531. (No model.)

*To all whom it may concern:*

Be it known that I, EDWIN C. MERRILL, of Pittsburg, in the county of Allegheny and State of Pennsylvania, have invented a new and useful Improvement in Gas - Pressure Regulators, which improvement is fully set forth in the following specification.

This invention has reference to apparatus for regulating the pressure and supply of gas, so as to equalize the same under varying pressures in the mains. It is specially designed for application to mains for conveying natural gas, but may be also applied to regulating the flow and pressure of ordinary gas.

Heretofore gas-regulators have been devised in which a simple valve, or sometimes a double-seated valve, is used to control the passage of the gas, the valve-stem being connected with a flexible diaphragm located on the outlet side of the valve, so that upon the pressure in the delivery-pipe becoming greater than desired the valve closes, cutting off further supply of gas until the pressure has fallen to or below the normal. In this class of regulators many difficulties have heretofore been encountered, which it is the object of the present invention to overcome. In the first place, it has been found impossible to secure a perfectly even and uniform pressure in the delivery-pipe, unless that in the supply pipe or main remains approximately steady. With the natural gas now extensively used in certain localities fluctuations in pressure upon the line frequently occur, on which account it is of great importance to provide a regulator whereby the pressure can be rendered practically steady and uniform. Moreover, with the ordinary regulator it is found that sudden and rapid movements or "flutterings" of the diaphragm, and consequently of the valve, are liable to occur. Thus, should the pressure on the outlet side of the valve suddenly fall, the latter would open wide and a rush of gas pass through the same, which, acting directly and forcibly upon the diaphragm, would cause the latter to close the valve with a quick movement, cutting off all supply. Thus the pressure would again fall and the action be repeated. Such occurrence not only interferes with the efficient working of the apparatus, causing an irregular flow of gas, but also produces great wear and tear upon the valve and valve-seat and other parts. Such occurrence is also attended by a jar or concussion in the pipe, and by a violent fluctuation of the flame at the point where the gas is being used.

According to the present invention, instead of a single valve-opening and valve, I employ two valves whose stems are connected with a lever, one on each side of the fulcrum and at equal distances therefrom. The valves are arranged on opposite sides of the partition which separates the high-pressure from the low-pressure chamber, so that both are open at the same time. The long arm of the lever is connected with a toggle-lever, which is operated by a rod secured to the diaphragm. These connections insure, in case of a change of pressure, a slow movement being given to the valves, preventing their rapid opening and closing, in the manner above explained. The size and construction of the valves are so regulated that they practically balance each other. The diaphragm by which the valves are operated is placed in a separate chamber, to which access of gas is had by a small opening or openings. This construction also tends to insure a deliberate movement of the parts, and to prevent rapid vibrations, since changes of pressure that take place affect the diaphragm gradually.

In addition to the foregoing, the invention consists in certain special constructions, combinations, and arrangements of parts, as hereinafter more fully described.

The accompanying drawings, which form a part of this specification, represent a gas-regulating apparatus constructed in accordance with the invention, Figure 1 being a sectional elevation, and Fig. 2 a partial view, in vertical section, in a plane at right angles to that of Fig. 1.

A is a high-pressure chamber, which is or may be cast in one piece of metal, and into which the gas enters from the main by the inlet *a*. In front of the inlet is placed a strainer or filter, *b*, which, as shown, consists of a conical vessel supported by the walls of chamber A, and which, in use, is filled with a filtering substance, such as hemp or other fibrous material. The walls of vessel *v* are perforated. The object of this device is to free the gas of any scale or rust from the main, or other impurities which might clog the apparatus or lodge between the valves and their seats. Directly above the strainer $b$ is an opening, $c$, closed by a screw-cap, $d$, through which the said strainer may be removed for cleaning without disturbing the joint or connection between the inlet-pipe and chamber A. In the wall $a'$ of chamber A are placed the valve-seats $e$, formed of screw-bushings of any suitable material, preferably brass. The valves $f$ $g$ are placed on opposite sides of wall $a'$. Their stems $f'$ $g'$ are connected with a lever, H, fulcrumed at $h$, and at equal distances from the fulcrum, so that the movement of the long arm of the lever H from right to left closes the valves by pushing valve $f$ and pulling valve $g$.

I represents a flexible diaphragm. It is placed in a chamber, C, separated from the low-pressure chamber E by a partition-plate, D. A small opening, $k$, serves to admit gas from chamber E to chamber C; or the gas may find its way to the latter through the opening through which rod F passes. The latter is rigidly fastened to the diaphragm, and moves with it, being guided in its bearings in plates B and D and projection G. The rod carries at its upper end a weight, K, which may be changed when it is desired to increase or diminish the normal pressure in the delivery-pipe L. The long arm of lever H is connected to a toggle-lever whose arms $m$ $n$ are connected by a pin, $o$. Arm $m$ is double or forked, as shown in Fig. 2, and embraces between its two branches at one end the lever H, and at the other the arm $n$. The pin $o$ projects through slots in each side of the enlarged part $p$ of the rod, and thereby effects a connection between said rod and the toggle-lever. As the parts are shown, should the diaphragm drop farther, the lever H would be moved to the right and the valves opened wider, admitting a greater quantity of gas. Should the pressure in chamber E become excessive, the diaphragm would gradually rise until the arms $m$ $n$ assume a horizontal position, when the valves would be closed. The lateral movement of the toggle-arms with respect to the rod F is permitted by the play of pin $o$ in the slots in part $p$. To diminish the friction of these parts, anti-friction rollers $o'$ may be mounted on pin $o$, as shown in Fig. 2.

It will be seen that by the construction described the movement of the diaphragm I is communicated to the valves with great deliberation, but with great force, the effective movement of the toggle-lever to close the valves taking place at the time when its motion is slowest, and consequently the most forcible. To insure that the closing of the valves shall be effected at the proper point in the movement of the toggle-lever, the latter can be adjusted by means of a screw, $q$, bearing against the end of arm $n$, and provided with a locking-nut, $r$.

The valves $f$ $g$ are so constructed as to balance each other as nearly as possible, approximately the same effective area being exposed to the pressure on the outside of valve $g$ as on the inside of valve $f$. Preferably, a soft washer, $s$, (rubber or leather,) is interposed between each valve and its seat, though this is not essential.

Valve-stem $g'$ is connected with its valve by a screw-connection, as shown, the object being to secure accurate adjustment of the parts, so that the seating of both valves will take place at exactly the same time.

To effectually provide against excessive pressure in pipe L—in case, for instance, of some defect in the operation of the regulator— a safety-valve or blow-off is provided, consisting of a mercury chamber or vessel, N, which is in communication with pipe L by a tube, $t$, whose lower end dips into the mercury. In case of too high pressure being developed in pipe L, the gas forces its way through the mercury and escapes by outlet $x$. Heretofore a mercury seal has been used in gas-regulating devices, usually in the form of a U bend or trap; but with such contrivance when the gas forces its way through the mercury a portion of the latter is carried away and wasted. In the device shown the vessel N is provided with an enlargement, P, at its upper end, where the mercury is received until the pressure subsides, when it again finds its way back to the chamber N.

It is obvious that modifications may be made in the details of construction and arrangements of parts without departing from the spirit of the invention, and that parts of the invention may be used without others, if so desired.

Having now fully described my said invention and the best mode known to me of applying the principle thereof, what I claim, and desire to secure by Letters Patent, is—

1. The combination, in a gas-pressure regulator, of the supply and delivery pipes, the two valves on separate stems, and the lever, the stems of said valves being connected with said lever, substantially as described.

2. The combination, in a gas-regulator, of the diaphragm, the two balanced valves having separate stems, and the connections comprising one or more levers for communicating the movements of said diaphragm to said valves, substantially as described.

3. The combination, with the high-pressure chamber and low-pressure chamber, separated by a partition, of the two balanced valves on opposite sides of said partition, and an operating-lever, to which the stems of said valves are connected on opposite sides of its fulcrum, substantially as described.

4. The combination, with the high-pressure and low-pressure chambers, separated by a partition, of the two balanced valves on opposite sides of said partition, and an operating-lever, the stems of said valves being connected to said lever on opposite sides of and at equal distances from its fulcrum, substantially as described.

5. The combination, with the supply and delivery pipes and the diaphragm, of two balanced valves, a lever to which the stems of said valves are connected on opposite sides of and at equal distances from its fulcrum, and the toggle-lever to which said first-named lever is connected, so as to communicate the movements of the diaphragm to the valves, substantially as described.

6. The combination of the balanced valves, the lever connected therewith, the toggle-lever, whereof one arm is connected with the aforesaid lever, the rod, and the diaphragm secured thereto, said diaphragm being separated from the valve-chamber by a partition having one or more small openings, substantially as described.

7. The combination, with the balanced valves, of the lever connected to the stems of said valves, one of said valve-stems being adjustable, substantially as described.

8. The combination of the valves, the diaphragm controlling the latter, connections including a toggle-lever between the valves and diaphragm, and means for adjusting said toggle-lever, substantially as described.

9. In combination with the gas-regulating valves and the supply and delivery pipes, of the mercury-vessel and the gas-tube entering said vessel, the latter being provided with an enlargement, substantially as and for the purpose described.

In testimony whereof I have signed this specification in the presence of two subscribing witnesses.

EDWIN C. MERRILL.

Witnesses:
PHILIP MAURO,
C. J. HEDRICK.